UNITED STATES PATENT OFFICE.

PHILIP SCHIDROWITZ, OF LONDON, ENGLAND, ASSIGNOR OF ONE-HALF TO CATALPO LIMITED, OF LONDON, ENGLAND, A BRITISH COMPANY.

MANUFACTURE OF CAOUTCHOUC AND CAOUTCHOUCLIKE PRODUCTS.

1,418,976.  Specification of Letters Patent.  Patented June 6, 1922.

No Drawing.  Application filed July 19, 1921. Serial No. 485,926.

*To all whom it may concern:*

Be it known that I, PHILIP SCHIDROWITZ, a subject of the King of England, residing at London, England, have invented certain new and useful Improvements in the Manufacture of Caoutchouc and Caoutchouclike Products, of which the following is a specification.

This invention is for improvements in or relating to the manufacture of caoutchouc and caoutchouclike products.

For incorporation with vulcanizable mixings such as rubber mixings, various materials have been used to act as fillers and for other purposes. Among such materials, which will hereinafter be referred to as carriers, clay, zinc oxide, French chalk, light carbonate of magnesia and calcium carbonate have been employed.

It is known that certain organic bases combine with carbon bisulphide yielding derivatives which when added to vulcanizable mixings considerably accelerate vulcanization, and among the compounds which have been proposed for this purpose may be mentioned the piperidine salt of piperidyldithiocarbamic acid, and the addition product which carbon bisulphide forms with dimethylamine. It is to the use of derivatives of this type in conjunction with carriers that the present invention relates.

According to this invention, an accelerator for addition to vulcanizable rubber mixings is prepared by synthesizing a carbon-bisulphide derivative of an organic base, for example, a carbon bisulphide derivative of piperidine, upon a carrier.

The carrier may be impregnated with one component of the organic derivative, and the impregnated material then sprayed with the other component, or treated with the vapour of the latter. In some cases, agitation during the operations is to be recommended in order to secure even distribution of the reagents, and it may be found desirable to grind and (or) sift the product after the conclusion of one or more of the operations in order to break up any aggregated portions.

The manufacture of caoutchouc or caoutchouclike products in which there is added to a vulcanizable mixing a carbon bisulphide derivative of an organic base is therefore characterized according to the present invention by the addition to the mixing of an accelerator prepared as described.

One form of carrier for the purpose of this invention consists of purified clay. This may be prepared from any suitable natural clay by washing and sedimentation or other process which is adapted to give a pure product, but preferably the clay utilized is one which has been prepared by aid of peptization (deflocculation).

By peptization is meant the dispersion of the clay in a fluid medium by addition of an appropriate quantity of a peptizing (deflocculating) reagent, for example, ammonia, sodium hydrate or sodium carbonate. The clay substance is then recovered from the dispersion in any known way. Clay the preparation of which has involved treatment of this kind is hereinafter designated colloidal clay. For example, a clay which has been submitted to the processes set forth in Feldenheimer's British patent specification, No. 106,890 or No. 121,191 (U. S. Patent No. 1,324,958) may be used.

The following examples will serve to indicate how the invention may be carried into effect, and it will be understood that these examples are given for illustrative purposes and not by way of limitation.

*Example I.*

100 lbs. of high-class china clay which has been treated according to the process described in the aforesaid U. S. specification No. 1,324,958 are sprayed with 20 lbs. of commercial piperidine, the clay being continuously raked over during the spraying to ensure proper admixture with the base. The treated clay is ground, and then distributed in thin layers upon a series of trays within a chamber which can be closed and is provided with a vent for vapour 16 lbs., representing an excess, of carbon bisulphide is introduced into the bottom of the vessel which is then closed, and the clay is left exposed to the vapour of the bisulphide until no further absorption of the latter takes place. The bisulphide may be allowed to volatilize spontaneously, or the process may be expedited by gently heating the bottom of the chamber with warm water or with steam.

The trays are removed from the chamber and left exposed in a warm well ventilated place until the excess of bisulphide is evaporated, and the clay is then ground and sifted. The accelerator so obtained contains about 20 per cent of the carbon bisulphide-piperidine derivative.

The following is an example of a rubber mixing containing this product:—

| Rubber | 200 parts. |
|---|---|
| Sulphur | 16 parts. |
| Clay accelerator | 5 parts. |
| Zinc oxide | 5 parts. |

This mixing on vulcanization is fully cured in about 2 minutes at 286° F., yielding a rubber composition which is particularly tough and of a high breaking strain.

Omitting the accelerator, the same mixing required, under otherwise identical conditions of operation, about 2½ to 3 hours to give a correctly cured product.

*Example II.*

100 lbs. of French chalk are introduced into a vessel provided with an agitator and a spraying device, and the vessel is closed. 25 lbs. of piperidine are then sprayed into the vessel upon the chalk, and when the latter and the base have been thoroughly admixed, 20 lbs. of carbon bisulphide (i. e. an excess) are sprayed into the vessel, the material during both operations being maintained in continuous agitation. To avoid resinification during the second stage of the process, the temperature of the mass should be kept down preferably below 30° C., by appropriately regulating the addition of the bisulphide, and keeping the materials well mixed.

The product is then ground and sifted as before. It contains about 25 per cent. of the bisulphide-piperidine compound. One example of a rubber mixing containing this accelerator is as follows:—

| Rubber | 200 parts. |
|---|---|
| Sulphur | 4 parts. |
| Accelerator | 4 parts. |
| Zinc oxide | 5 parts. |

On vulcanization, this mixing is fully cured in about 5 minutes at 286° F.

It will be appreciated that the particular procedure followed and the proportions of the materials utilized in any given case may be varied in many ways without departing from the invention. For example, the amount of the accelerator, i. e. the carrier incorporated with the bisulphide derivative, added to the vulcanizable mixing may range within considerable limits, and the proportion of carbon-bisulphide derivative on the carrier may be adjusted as desired, and consequently the quantity of the former introduced into a given mixing may be easily regulated according to need. The accelerator may itself furnish the filler for the vulcanized composition, or may be employed in conjunction with other materials which serve this purpose. The invention provides a means of readily preparing and of applying the organic derivatives in question in smaller or larger quantity, and at the same time of securing their even distribution throughout the mixing. By synthesis upon a carrier the derivative is produced in a state of fine division, and this also facilitates even distribution throughout the mixing and uniform vulcanization.

What I claim as my invention and desire to secure by Letters Patent is:—

1. The process for the manufacture of a vulcanized rubber composition which comprises synthesizing an agent accelerating vulcanization upon a carrier to be incorporated with the rubber mixing.

2. The process for the manufacture of a vulcanized rubber composition which comprises synthesizing a carbon bisulphide derivative of an organic base upon a carrier to be incorporated with the rubber mixing.

3. The process for the manufacture of a vulcanized rubber composition which comprises synthesizing a carbon bisulphide derivative of piperidine upon a carrier to be incorporated with the rubber mixing.

4. The process for the manufacture of a vulcanized rubber composition which comprises synthesizing a carbon bisulphide derivative of an organic base upon a carrier incorporating the carrier with a rubber mixing and vulcanizing the mass.

5. The process for the manufacture of a vulcanized rubber composition which comprises synthesizing a carbon bisulphide derivative of piperidine upon colloidal clay to be incorporated with the rubber mixing.

6. The process for the manufacture of a vulcanized rubber composition which comprises impregnating colloidal clay with piperidine, spraying the impregnated clay with carbon bisulphide, incorporating the product with a rubber mixing, and vulcanizing the mass.

7. The process for the manufacture of a vulcanized rubber composition which comprises impregnating colloidal clay with piperidine, grinding the impregnated material, spraying it with carbon bisulphide, grinding the product, incorporating it with a rubber mixing and vulcanizing the mass.

In testimony whereof I affix my signature.

PHILIP SCHIDROWITZ.